US010556692B2

(12) United States Patent
Fuerstenberg

(10) Patent No.: US 10,556,692 B2
(45) Date of Patent: Feb. 11, 2020

(54) SEAT RAIL SYSTEM FOR AN INTERIOR SPACE OF A VEHICLE

(71) Applicant: Airbus Operations GmbH, Hamburg (DE)

(72) Inventor: Malte Fuerstenberg, Hamburg (DE)

(73) Assignee: Airbus Operations GmbH (DE)

( * ) Notice: Subject to any disclaimer, the term of this patent is extended or adjusted under 35 U.S.C. 154(b) by 87 days.

(21) Appl. No.: 15/609,271

(22) Filed: May 31, 2017

(65) Prior Publication Data
US 2017/0341756 A1 Nov. 30, 2017

(30) Foreign Application Priority Data

May 31, 2016 (DE) .................. 10 2016 110 022

(51) Int. Cl.
B64D 11/06 (2006.01)
(52) U.S. Cl.
CPC ...... B64D 11/0696 (2013.01); B64D 11/0639 (2014.12)
(58) Field of Classification Search
CPC .............. B64D 11/0696; B64D 11/064; B64D 11/0639; B64D 11/06; B64C 1/18
USPC ........................ 248/424, 429, 430; 244/118.6
See application file for complete search history.

(56) References Cited

U.S. PATENT DOCUMENTS

| 3,142,461 A | 7/1964 | Naylor |
| 3,381,927 A | 5/1968 | Stamates |
| 4,936,527 A | 6/1990 | Gorges |
| 6,260,813 B1 | 7/2001 | Whitcomb |
| 6,561,458 B1 * | 5/2003 | Lowery .............. B64D 11/0696 244/118.6 |
| 6,659,402 B1 | 12/2003 | Prochaska |
| 7,083,146 B2 | 8/2006 | Hiesener |
| 7,448,822 B2 * | 11/2008 | Nebeker ............. B60R 13/0206 24/580.1 |
| 7,607,736 B2 * | 10/2009 | Ponzo De Siqueira ..................... B64D 11/0696 244/118.1 |
| 7,857,259 B2 * | 12/2010 | Baatz ....................... B64C 1/20 244/118.6 |

(Continued)

FOREIGN PATENT DOCUMENTS

| DE | 103 07 870 A1 | 9/2004 |
| DE | 10 2007 063 565 A1 | 6/2009 |

(Continued)

Primary Examiner — Nkeisha Smith
(74) Attorney, Agent, or Firm — Lerner, David, Littenberg, Krumholz & Mentlik, LLP

(57) ABSTRACT

A vehicle cabin seat rail system includes a seat rail having a top side having a plurality of raster openings and mechanically couplable with a cabin floor, a plurality of holding devices positionable on the top side, each being selectively engageable with at least one first raster opening or at least one second raster opening for arresting the holding device and configured for holding an object on the seat rail, and a plurality of marking devices couplable with the seat rail, and configured for optically or mechanically indicating approaching of a first position on the seat rail corresponding to the first raster opening of a respective holding device and of a second position of the same holding device corresponding to the second raster opening, in relation to another object arrested on the seat rail, to prevent an arresting of the holding device on the seat rail on other positions.

17 Claims, 4 Drawing Sheets

(56) References Cited

U.S. PATENT DOCUMENTS

| | | | |
|---|---|---|---|
| 7,857,561 B2 * | 12/2010 | Mejuhas | B64D 11/0696 |
| | | | 410/105 |
| 8,033,501 B2 * | 10/2011 | Callahan | B64C 1/20 |
| | | | 174/74 R |
| 8,074,954 B2 * | 12/2011 | Wilhelm | B64D 11/0696 |
| | | | 244/118.6 |
| 8,910,907 B2 | 12/2014 | Gonnsen et al. | |
| 8,944,378 B2 * | 2/2015 | Bishop | B64D 11/0696 |
| | | | 244/118.1 |
| 9,656,753 B2 * | 5/2017 | Schomacker | B60N 2/07 |
| 9,713,969 B2 * | 7/2017 | Schomacker | B64D 11/0648 |
| 2006/0097109 A1 | 5/2006 | Laib et al. | |
| 2010/0038483 A1 * | 2/2010 | Yamasaki | B64D 11/0696 |
| | | | 244/118.6 |
| 2014/0077577 A1 | 3/2014 | Gensch et al. | |
| 2017/0259925 A1 | 9/2017 | Olulana et al. | |
| 2019/0047443 A1 | 2/2019 | Gross | |

FOREIGN PATENT DOCUMENTS

| | | |
|---|---|---|
| DE | 102008006947 A1 | 8/2009 |
| DE | 10 2009 004 987 A1 | 7/2010 |
| DE | 10 2012 012 686 A1 | 1/2014 |
| DE | 10 2013 103 667 A1 | 10/2014 |

\* cited by examiner

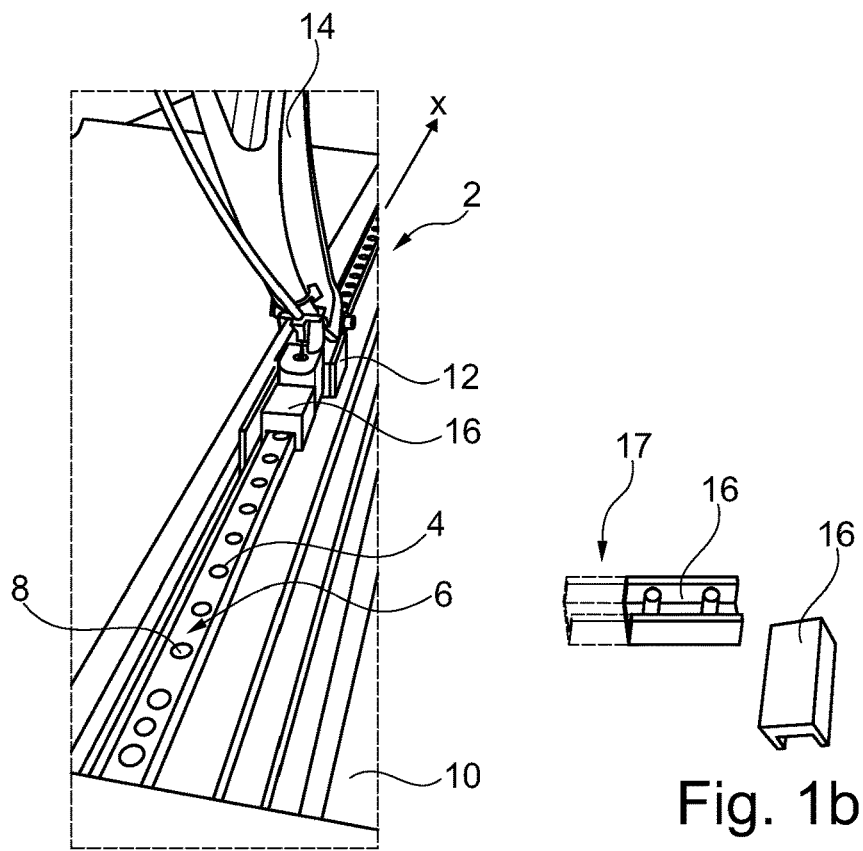
Fig. 1a
Fig. 1b
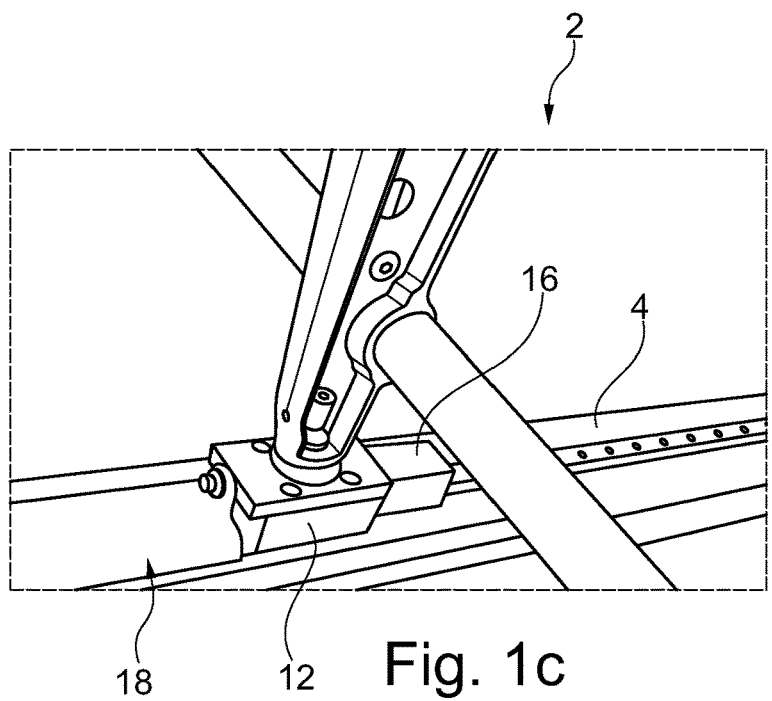
Fig. 1c

SEAT RAIL SYSTEM FOR AN INTERIOR SPACE OF A VEHICLE

FIELD OF THE INVENTION

The invention relates to a seat rail system for an interior space or for a passenger cabin of a transportation means, respectively. In particular, the invention relates to a seat rail system for a passenger cabin of a transportation means as well as aircraft having such a seat rail system.

BACKGROUND OF THE INVENTION

In interior spaces of transportation means, passenger seats and installations are often fastened on rails, which are arranged in or at a floor. Such rails usually comprise arresting means arranged in a raster, which allow a flexible fastening of the respective installations at a desired location. It is further known to change a seating density in a cabin of a transportation means through enlarging or reducing the distance between two seat rows following each other in a longitudinal direction. This distance is known as "seat distance" or "seat pitch". Since usually a plurality of seat rows with a plurality of passenger seats arranged abreast is distributed in the cabin, the individual seat distances need to be maintained precisely, such that the desired passenger comfort as well as the desired utilization of the cabin are achieved.

The precise positioning of seat rows and other installations requires an exact acquisition of the distances between the respective installations, which is relatively complex. In particular with the rails being arranged on a floor, this requires a quite unergonomic handling of measuring devices kneeling on the floor. Particularly with larger passenger cabins, this can be very cumbersome, if cabin personnel have to conduct this process and cannot establish a routine, as the position changes are to be conducted rather seldomly.

DE 10 2008 006 947 A1 shows a system for a synchronous longitudinal displacement of a plurality of selected seats or seat rows in an aircraft, at which inter alia a drive device for displacing the seats is utilizable.

BRIEF SUMMARY OF THE INVENTION

An aspect of the invention lies in proposing an improved, adaptable seating configuration by means of a rail system or another device capable for fastening of objects, at which device a manual reconfiguration in particular of seats is simplified.

A seat rail system for a cabin of a vehicle is proposed, comprising a seat rail having a top side, which comprises a plurality of raster openings and is mechanically couplable with a floor of the cabin. The seat rail system comprises a plurality of holding devices positionable on the top side of the seat rail, which each are selectively engageable with at least one first raster opening or at least one second raster opening for arresting the holding device and which each are designed for holding an object on the seat rail. Further, the system comprises a plurality of marking devices couplable with the seat rail, which are designed for indicating approaching of a first position on the seat rail corresponding to the at least one first raster opening of a respective holding device and of a second position of the same holding device corresponding to the at least one second raster opening, in relation to another object that is arrested on the seat rail, in order to prevent an arresting of the holding device on the seat rail on other positions.

In the context of the invention, a seat rail is an elongate component, which is positionable in particular parallelly to a longitudinal extension of the cabin in a floor of the cabin and which is mechanically coupled with a structure of the vehicle. The seat rail serves for introducing forces and loads from objects fastened thereto into the structure of the vehicle.

In the prior art, different kinds of seat rails, are known, from which however, a type of construction known as "Douglas rail" has established particularly for aircraft cabins. This comprises a substantially belt-like base, onto which two cantilevers facing each other are arranged, which enclose a flat hollow space on the base, are distanced through a gap and are penetrated by circular openings along the gap in regular distances, which evenly extend from the gap over both cantilevers. The base may comprise a stiffening profile at a bottom side facing away from the cantilevers.

A holding device, which is coupled with an object to be fastened, is placeable onto the top side of the seat rail and may be arrested or locked on the rail, respectively. For this, mushroom-like shaped locking elements having a shaft and a plate-like end arranged thereon are known, which locking elements are insertable into the hollow space of the seat rail through the openings and are movable along the shaft. A plate-like end may be clamped with a surface section of the cantilevers facing into the hollow space through exertion of a tensile force through the shaft, which surface section is arranged between the openings. A displacement of the holding device is accomplished through releasing the locking element, such that the plate-like end substantially contact-lessly remains in the hollow space and the locking element is movable along the gap in the rail. The shaft of the locking element is hereby adapted to the width of the gap of the rails.

Also, other embodiments are known, with which holding devices are glidingly supported completely. For this, the rail comprises a gliding profile, which is correspondingly shaped with a recess on the holding device. Through using one or a plurality of undercuts, a lifting-off of the holding device from the rail may reliably be prevented and a movement of the holding device is only possible along the main extension of the rail. A locking element, which is arranged on the holding device, may be limited to a movably supported pin, which may engage into raster openings, which are open to a top side of the rail.

All of these seat rails are mechanically couplable with a cabin floor of a vehicle, which does not necessarily mean that a direct connection between the seat rail and the floor is required. In fact, also retrofit or add-on solutions may be utilized, with which a seat rail of one of the mentioned types may be arranged on a seat rail of another type or may be arranged on another structural component and mechanically coupled with the floor indirectly.

For example, the holding devices carry a part of a seat frame of a passenger seat or a passenger seat row. The relative positions of two holding devices that directly follow on each other of two seat frames that follow on each other in longitudinal direction define the seat distance of the associated seat rows. In doing so, a first seat distance may be represented through a first position, while a second seat distance may be represented through a second position. If the seat distances of more than two seat rows should be adjusted between a first seat distance and a second seat distance, a plurality of first positions and a plurality of second positions are required for this, which are assigned to one or more holding devices of an individual seat frame in each case.

Instead of utilizing required measuring devices for a cumbersome measuring of seat distances and/or relative positions, according to an embodiment of the invention marking devices are used, which are couplable with the seat rail. For a user, the shifting of the holding devices on the seat rail is thereby clearly simplified, since directly and immediately during the displacement of a holding device, an optical or haptic feedback is generated. The marking devices are independent from the remaining cabin through their coupling with the seat rail and may be arranged during conception or reconfiguration once, in order to permanently allow a simplified adjustment of different seat distances. The mechanical coupling with the seat rail may furthermore allow an alignment of the marking devices on the raster openings, which prevents an inadvertent wrong positioning of marking devices, which may particularly arise with the integration on neighboring floor coverings or other installations. The first and second positions, which are indicated through the marking devices, are consequently unambiguous and precise.

In their most general form, the marking devices may comprise arbitrary design features, which allow an optical and/or haptic marking. While notches, projections, engravings, colored markings, marking pins or inserts for raster openings are conceivable, alternatively or additionally thereto also holding blocks may be utilized furthermore, which are mechanically coupled with raster openings and which do not allow a displacement of the holding device over a first or second position, respectively, through their shaping.

In an advantageous embodiment, the first position of a holding device corresponds to a first seat distance and the second position of the holding device corresponds to a second seat distance of two seats or seat rows arranged on the seat rail. A seat distance is at least 26 inch for an extremely dense seating and reaches 90 inches or more for particular high end seat classes. An enlarging of the seat distance about one to a few inches may already mean a clear gain in comfort for a passenger. The marking devices in the seat rail system according to an embodiment of invention are designed in a way, that the displacement of holding devices, which are connected to seat frames of passenger seats, unambiguously indicate in two different relative positions, if a correct positioning is accomplished. Since a seat distance is a relative measure between two passenger seats arranged behind each other, the marking devices may be designed differently or positioned differently through the resulting chain dimension for the use on a plurality of seat rows that follow on each other.

In an advantageous embodiment, at least one of the marking devices comprises a rail cover couplable with the top side of the seat rail, which rail cover has at least two overlapping sections that are movable relative to each other and that fully extends between holding devices arranged behind each other of two objects arranged behind each other. At least one of the sections comprises a view opening facing away from the seat rail, which view opening is designed in a manner that exclusively in the first position and in the second position a respective position marking arranged between the at least one of the sections and the seat rail on a side of the rail cover that faces away from the seat rail is visible. It is known to at least partially cover seat rails in passenger cabins in particular of aircraft, such that unevennesses in a floor of the passenger cabin are prevented or reduced, respectively. Also, by means of a rail cover soiling or damaging of a seat rail may be prevented. The use of a length-variable rail cover as a marking devices is particularly reasonable, since additional weight for a separate marking device may hereby be saved. The provision of a view opening in a section of the rail cover allows an observer to look under the respective section. If a marking is arranged at a location corresponding to one of both positions, it is placed flush with the view opening, if one of the predetermined positions is reached. The marking may be placed on the lower section of the rail cover, with which the upper section overlaps underneath the view opening. As an alternative thereto, a marking may also be placed directly on the seat rail, exemplarily in one of the raster openings, which is then visible through the view opening, if one of the predetermined positions is reached.

The seat rail cover may be manufactured from a plastics material, which comprises a particularly low weight and does not have to comprise a particularly great mechanical stability. The purpose of the seat rail cover is limited to the cover of the seat rail and a respective marking without loads having to be absorbed in any way.

In an advantageous embodiment, one of the sections of the rail cover is connected to a first object and the other section is connected to a second object adjacent along the rail cover. On displacing the first and the second object relative to each other, the respective sections are entrained by the objects, on which they are fastened, and are also displaced relative to each other. This has the particular advantage, that not only the rail cover is always closed, but also possible markings are visible by means of a view opening or other devices directly during the displacement.

The marking may particularly comprise an insert, which is insertable into a raster opening of the seat rail. Such a marking is precisely positioned through the present raster of the seat rail and always remains at the predetermined installation position during the operation of the vehicle at least through the rail cover. Consequently, an alignment of the holding device in one of the predetermined positions is precisely achievable, too. A further advantageous side effect lies in that an engagement of an arresting device coupled with a holding device and the respective raster opening is impossible and a wrong alignment is thereby prevented.

Advantageously, the insert comprises a cylindrical shape with an outer diameter, which is adapted to the diameter of a raster opening. The length of the insert may furthermore be dimensioned in a manner that the insert in the raster opening is flush with the top side of the seat rail. Both a partial engagement with the respective raster opening is prevented and gliding of a holding device on the seat rail is not impaired. This is particularly advantageous with the use of a previously mentioned glide rail.

In a particularly advantageous embodiment, all free raster openings, which do not correspond with at least one first or the at least one second position and at which no marking devices are arranged, are closable or blockable, respectively, with an insert. Thereby, any wrong arresting in a raster opening without assigned position can be prevented.

An insert may furthermore comprise an engagement device facing to the top side of the seat rail, which is designed for the engagement of a tool, in order to remove the insert from the raster opening. The engagement device may particularly be designed as a profile with an undercut, into which a hook-like shaped end of a tool may engage.

As an alternative or additionally thereto, an insert may also be equipped with a latching device, which is designed for providing a mechanical engagement with the seat rail through rotation of the insert inserted into the raster opening. For this purpose, the raster opening may be equipped with a protrusion, into which the latching device may engage. As an alternative, the latching device may be designed for engaging with a bottom delimiting edge of the raster opening.

In particular, an insert may be made from a plastics material. It is conceivable to equip the insert with a slot and an outer diameter that at least in a partial section of the slot exceeds the diameter of the raster opening. Through inserting the insert into a raster opening, the insert is consequently compressed in the region of the slot. Due to this type of construction, the insert aims at urging back into its original shape, such that its circumferential surface presses onto the inner walling of the raster opening and clamps with the raster opening in an easily releasable manner.

The seat rail system may furthermore comprise at least one holding block, which is engageable with at least one raster opening. The holding block is designed for providing a mechanical stop for a holding device fastened to the seat rail, in particular through providing one or a plurality of stop faces, which advantageously extend perpendicularly from the top side of the seat rail or from a resting surface of the holding block, respectively. If a holding block is arranged on the seat rail, the holding device is merely displaceable up to a delimiting surface of the holding block. The displacement of the holding device to a predetermined end position is clearly facilitated for the user. A holding block may be designed arbitrarily and is engageable with at least one raster opening of the seat rail. Through an extension of the holding block into a direction facing away from the top side of the seat rail, a holding device may conduct a surface contact with the holding block and, consequently, cannot be moved further than the holding block. Such a design is particularly unambiguous for a user, since both the haptic feedback is distinct and also the movability of the holding device is limited.

It is conceivable to provide at least one holding block for each object, wherein a precise positioning at the first and the second position is accomplished, if two holding blocks for each holding device or for one holding device of an object to be fastened is used.

It is particularly preferred that the holding block is a component made from a plastics material, which comprises a resting surface, which corresponds to a top side of the seat rail. Protrusions may be arranged at or in the resting surface, which are insertable into raster openings of the seat rail, such that a support in the longitudinal direction of the seat rail is accomplished. It is conceivable that a holding body comprises a profile cross-section, which encloses the profile cross-section of the seat rail in a plier-like manner. The protrusions of the resting surface consequently lie in an indentation or are bordered from sidewalls, respectively, which enclose the seat rail in a plier-like manner. A particularly durable, highly stressable mechanical connection of the holding blocks with the seat rail is not required, since the holding blocks merely act as a haptic marking and the objects are latched on the seat rail themselves. The holding blocks may consequently comprise a particularly low weight and a low mechanical rigidity.

For receiving passengers in the passenger cabin it is advantageous if the object comprises a seat frame for receiving of seat surfaces. In this case, it may be advantageous to utilize a group of holding blocks for a group of objects, wherein the group consists of at least one holding block for each seat frame. In the context of the invention, a seat frame is a highly loadable mechanical frame construction fastenable to a cabin floor, which primarily serves for providing a basis for passenger seats and may receive both seat surfaces as well as swivably supportable backrests on the seat frame. In commercial aircraft, seat frames have established, which are able to receive two, three or four seat surfaces and are fastenable on seat rails. Exemplarily, a seat frame comprises two groups of one forward seat leg, a rear seat leg and a diagonal strut extending therebetween in each case, wherein each group of these components spans a plane running vertical to a cabin floor. Both these groups are distanced from each other and commonly support a forward and a rear support tube, which serve for receiving of seat units at a distance from a cabin floor. For limiting the individual receiving sections, seat partitions may be utilized, which are adapted for fastening an arm rest for example. When displacing a seat frame, a holding block may be arranged between the forward seat leg and the rear seat leg, such that a displacement is allowed, which is limited by the clearance between the seat legs. Depending on the size of the group, i.e. of the number of seat frames or objects, respectively, and from the desired displacement, different embodiments may be considered. If a widening of a group of seat frames is desired, with which each seat distance is increased by a certain distance, all objects but one need to be displaced from a first position to a second position, if the first position stands for a low seat distance or vice versa, respectively, in case the first position stands for a wide seat distance. A first seat row has to be displaced about exactly this distance, a following seat row about the double distance, a further following seat row about the triple distance, etc., since the change of the seat distance as chain dimension is added for each further seat row. Since a seat frame only allows a limited displaceability, if holding blocks between the seat legs are arranged, an unlimited widening of the seat distances cannot be accomplished with this process, only individual groups of exemplary 12 seat rows or less may be equipped with such a group of holding blocks. For an individual adaption to the displaceability accomplishable by the seat frame, which depends on the position of the seat frame in the group of seat frames, both a holding block having an individual length may be used, which is arranged at a certain position underneath the seat frame, or two separate holding blocks of the same length may be used, which are placed in a certain distance to each other, in order to generate a stop for the first and the second position.

In an advantageous embodiment, one group consists of 12 objects at a maximum. A common seat frame is dimensioned in such a manner that between a forward seat leg and a rear seat leg, a distance of about 13 to 15 inches is present. If a holding block having a length of one inch is provided, a maximum displacement of 12 to 14 inches may be accomplished. If a widening of one inch of the seat distance is desired, a first seat row must be displaced about one inch, a $12^{th}$ seat row about 12 inch. While at the $12^{th}$ seat row a single holding block is sufficient, which comprises a length of one inch in order to provide an end stop for the first and the second position at a distance of 12 inch, for all other seat rows, other designs are required. The $11^{th}$ seat row is displaced about 11 inches exemplarily, such that the length of the holding block of two inches an end stop for the first and the second position is given. A the $10^{th}$ seat row, consequently, the holding block must comprise a length of three inches or two holding blocks with a length of one inch each are to be utilized, which have a distance of one inch to each other. If the clearance between the seat legs is larger or less than given above it is possible to change the number of the members of one such group without further ado and/or to adapt the size and number of the holding blocks. The same also applies for the seat distance to be adjusted. For example, the group may also comprise six seat frames, which may assume seat distances, which are separated about two inches from each other. A last seat row has to be displaced about 12 inches hereto, such that a single holding block is sufficient for end stops. All other seat rows have to be adapted in their movability, which is possible either through respectively prolonged holding blocks or through holding blocks having a length of exemplarily one inch, which are distanced from each other.

The invention further relates to a seat arrangement for a passenger cabin of a vehicle, the seat arrangement comprising a previously explained seat rail system and at least one group of passenger seats, which are arranged adjacent to each other along the longitudinal direction of the seat rail.

The invention further relates to a vehicle having a passenger cabin and a seat rail system arranged therein according to the previous description. In a particularly advantageous embodiment, the objects are realized as passenger seats having a seat frame and seat and back cushions arranged thereon, wherein the marking devices are arranged between a forward seat leg and a rear seat leg. As an alternative or additionally thereto, marking devices are arranged between seat frames, which are at a distance to each other in a longitudinal direction.

In a particularly preferred embodiment, groups of objects are created, wherein each group comprises a compactable object, which is compactable or expandable for releasing of installation space. This may particularly be a seat row, with which seat surfaces are foldable into a vertical stowage position, such that seat rows connecting thereto experience a larger movement space and utilize the space previously occupied by the seat surface in the use position.

BRIEF DESCRIPTION OF THE DRAWINGS

Other characteristics, advantages and potential applications of the present invention result from the following description of the exemplary embodiments illustrated in the figures. In this respect, all described and/or graphically illustrated characteristics also form the object of the invention individually and in arbitrary combination regardless of their composition in the individual claims or their references to other claims. Furthermore, identical or similar objects are identified by the same reference symbols in the figures.

FIG. 1a to 1f show different partial views of a rail system according to an embodiment of the invention.

DETAILED DESCRIPTION

Figure 1D:
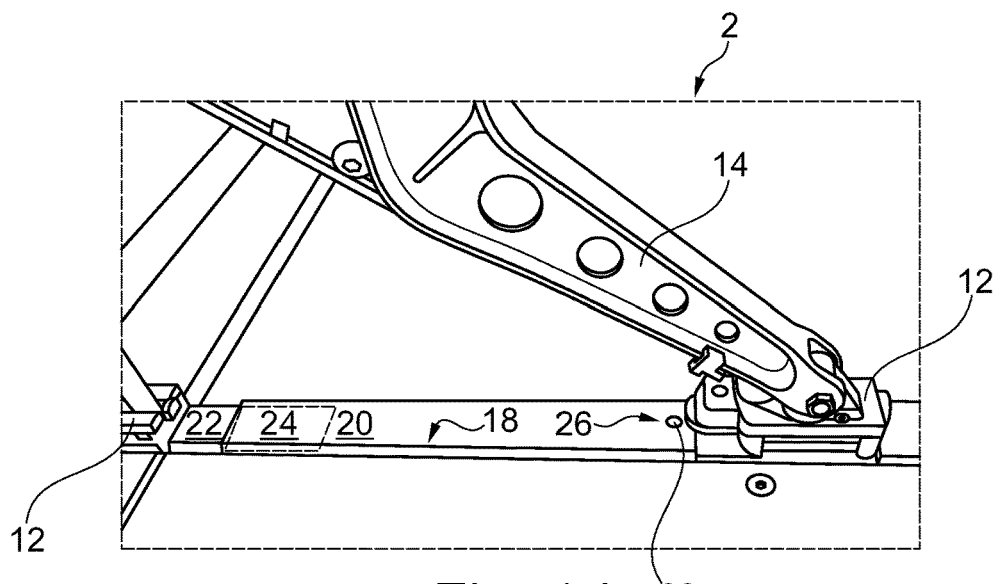

In the FIGS. 1a to 1e, a rail system 2 is shown in different (partial) views, which comprises a seat rail 4 having a top side 6. On the top side 6, a plurality of raster openings 8 are arranged, which are distributed along a main extension direction x in a length raster at the top side 6. The length raster may exemplarily provide a distance of one inch between the raster openings 8. The seat rail 4 is mechanically couplable with a floor 10 of a cabin, either through direct connection to a (floor) structure or another installation connected to the (floor) structure. In this illustration, the seat rail 4 is realized as a glide rail, at which the holding devices 12 are supported in a gliding manner and may be locked by means of bolts, pins or the such at the raster openings 8. The seat rail 4 may either be installed self-sufficient or create a retrofit solution on a common seat rail.

Each holding device 12 is mechanically connected with a section of a seat frame 14 of a passenger seat. A fixed positioning of the seat frames 14 on the seat rail 4 may be accomplished through the locking with the raster openings 8, such that the loads of the seat frame 14 occurring during the operation of the vehicle are transferred into the seat rail 4 exclusively at the adjusted position.

The seat rail system 2 is particularly suitable for selectively displacing holding devices along the seat rail 4 in order to exemplarily change the seat distance of a plurality of passenger seats arranged one behind each other. In order to achieve a particularly precise, intuitive and rapid manual reconfiguration of a cabin equipped herewith, the seat rail system 2 comprises marking devices in form of holding blocks 16 as well as rail covers 18 that have a variable length and whose function is described further below.

If for example for a group of passenger seats a seat distance is to be changed, all passenger seats expect a starting row have to be moved. It is conceivable to provide a holding block 16 for a passenger seat opposed to the start row, which holding block 16 limits the displacement distance of the respective seat row. A holding block 16 may be provided with different lengths, as illustrated by means of a dashed additional length 17 in the seat system 2. In FIGS. 1a and 1c, a holding block 16 is in a surface contact with a holding device 12.

Between all intermediate seat rows, in particular length-variable rail covers 18 may be installed, which comprise a first section 20 and a second section 22, which are designed to be at least partially overlapping, as indicated through a dashed overlapping region 24. Such a rail cover 18 is arranged in particular between the holding devices 12 of two passenger seat rows arranged behind each other.

A number of raster openings 8 are covered by the rail cover 18 and are not visible any more for a user. However, the rail cover 18 comprises a view opening 26 in its first section 20, which allows to view onto the seat rail 4 arranged underneath. If in a certain raster opening 8 a pin marked in terms of color or an insert 28, respectively, is arranged, it is visible if the respective raster opening 8 and the view opening 26 are flush. The seat rail cover 18 in this case acts as a marking together with the insert 28.

It is conceivable that a seat rail cover 18 is also utilizable as a marking device for two different positions exemplarily by two subsequent or separated raster openings 8 comprising pins or inserts 28, respectively, with a different color, such that a user may assign a first position to a first color visible through the view opening 26, a second position to a second color. This case is exemplarily shown in FIG. 1e, at which the insert 28 is shown with dashed lines and where the view opening 26 releases a second insert 30.

Figure 1E:
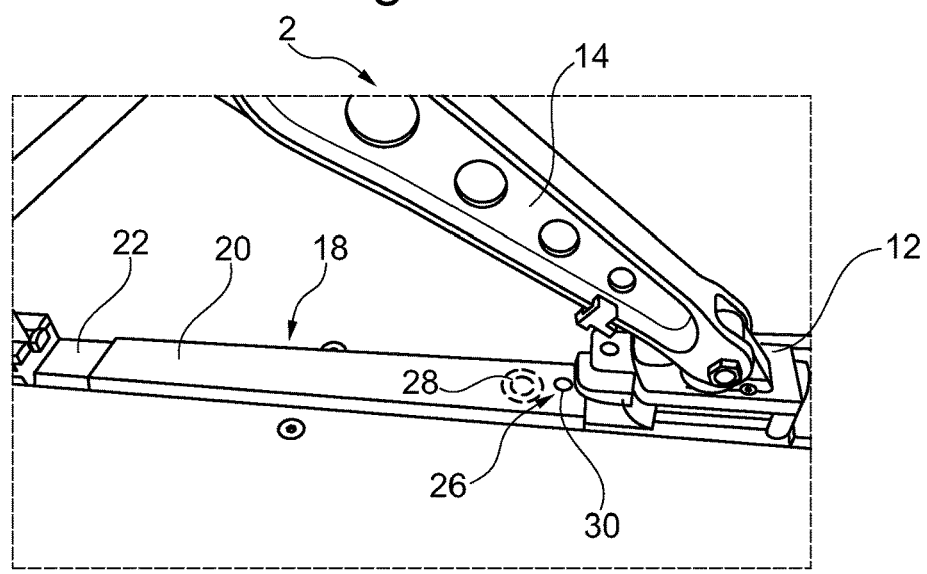

As furthermore visible in FIGS. 1c, 1d and 1e, the sections 20 and 22 may each be connected to a holding device 12, such that when displacing the holding devices 12, directly the length of the rail cover 18 is adapted and when the desired first or second position is reached, the respective marking is directly visible.

Figure 1F:
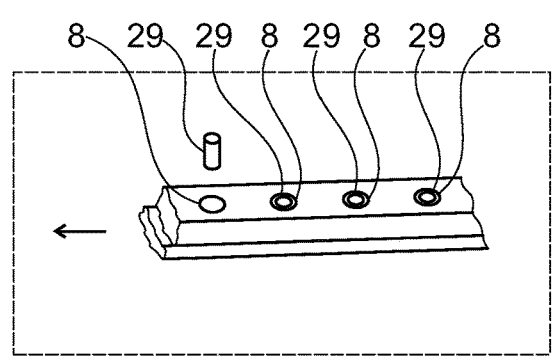

As shown in FIG. 1f, inserts 29, which may be used as marking devices with a respective visible indication, may be inserted into raster openings 8 of the rail 4 in a flush manner, such that the raster openings 8 are completely filled and the rail 4 comprises a closed top side. Thereby, an arresting of holding devices 12 at undesired positions is prevented.

Figure 2A:
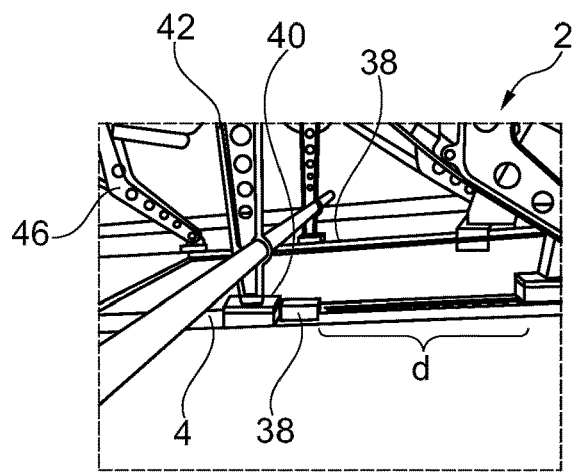
FIGS. 2a to 2f show the displacement of seat rows on the rail system according to an embodiment of the invention.
Figure 2D:
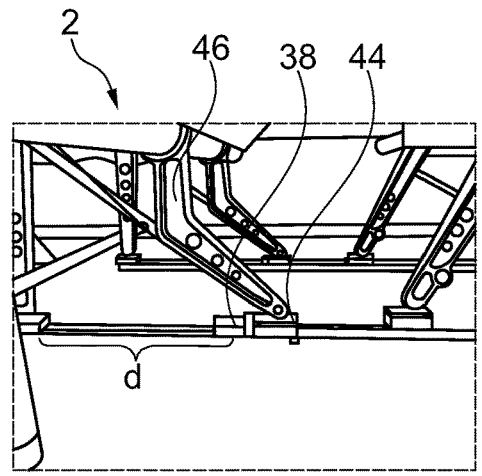
Figure 2B:
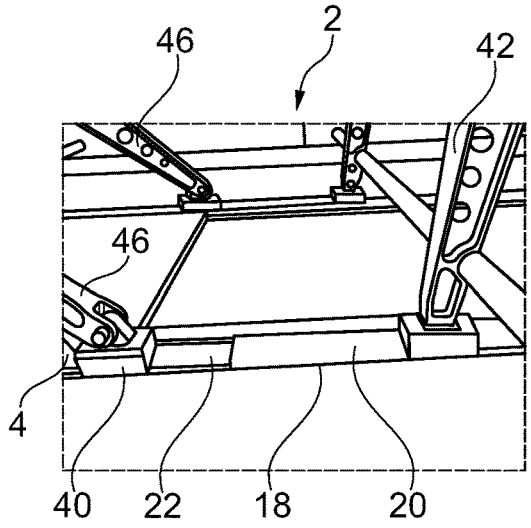
Figure 2E:
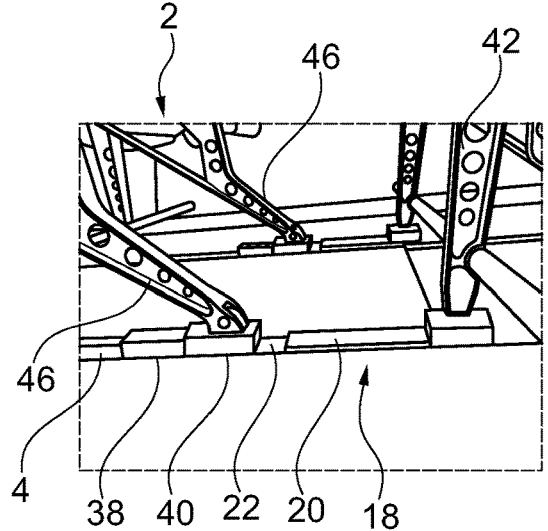
Figure 2C:
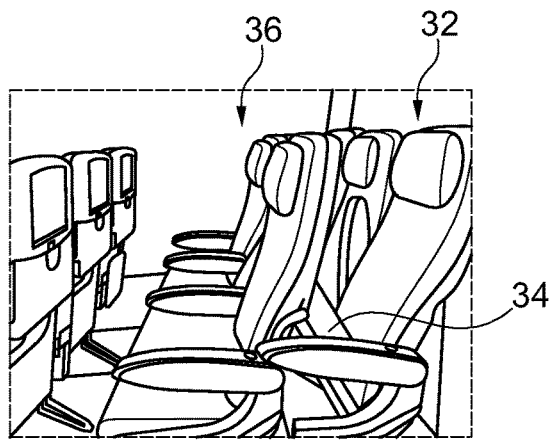
Figure 2F:
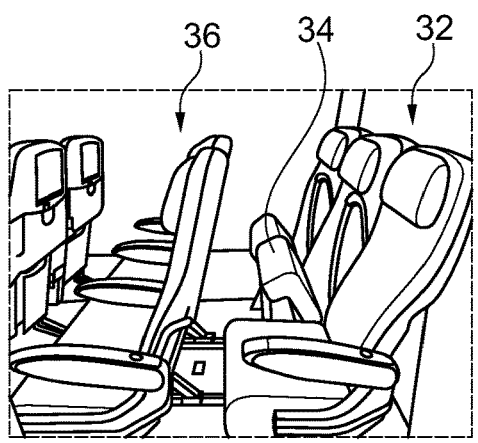

FIGS. 2a to 2c in a left column of the figure page show seat frames 14 with an enlarged seat distance, while in FIGS. 2d to 2f in a right column of the figure page, seat frames with a reduced seat distance are shown. FIG. 2c shows a compacted seat row 32 having a folded up seat surface 34, which may release more installation space for remaining seat frames 14 through the reduced installation space. This additional installation space may exemplarily be 12 inches. A first seat row 36, which directly connects to the compacted seat row 32, may consequently be displaced about a distance of 12 inches to the compacted seat row 32. If five more seat rows in longitudinal direction x of the seat rail 4 are arranged in front of it, the six seat rows altogether may comprise a seat distance enlarged by 2 inches.

The first seat row 36 comes into a contact with a forward holding block 38 through displacing to the compacted seat row 32, where it nestles to a holding device 40 of a forward seat leg 42. The end position may be understood as first position. The possible displacement distance is given with d in FIGS. 2a and 2d.

FIG. 2d shows the seat row 36 in a second position at a distance from the seat row 32, at which the holding block 38 comes into contact with a holding device 44 of a rear seat leg 46. Consequently, the displacement distance d is 12 inches in this example.

For adapting the seat distances of all seat rows arranged in front of it, rail covers 18 may be utilized, at which the individual first and second position of the respective seat frame 14 can be read. Hereby, the rail covers 18 are connected to a forward seat leg 42 and a rear seat leg 46 in each case and thereby show the progression to or the reaching of a desired end position, respectively, directly during the displacement.

Figure 3:
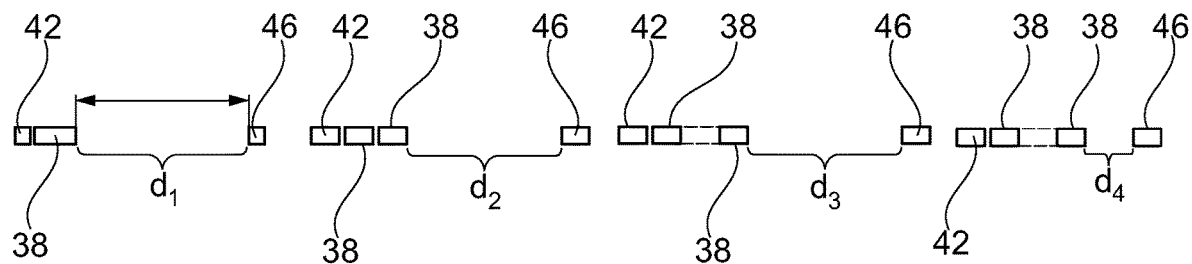
FIG. 3 schematically illustrates a use of a group of holding blocks.

Based on four seat rows, FIG. 3 schematically shows an arrangement of holding blocks 38 underneath of seat frames 14 with a forward seat leg 42 and a rear seat leg 46, wherein the holding blocks 38 limit the displaceability of the seat frame on the seat rail. A forward seat row may be displaced about the distance $d_1$, for this only a single holding block 38 is provided, which is either in contact with a holding device 12 arranged at the forward seat leg 42 or with a holding device 12 arranged at the rear seat leg 46.

A further, seat row, which is located behind, may merely be movable about a distance $d_2$, for which two holding blocks 38 are arranged underneath the seat frame 14, from which a forward holding block 38 comes into contact with the holding device 12 at the forward seat leg 42 or a rear holding block 38 with the holding device 12 at the rear seat leg 46. Exemplarily, both holding blocks 38 are seamlessly attached to each other; also a larger holding block 38 may be utilized or, depending on the difference between the seat distances, a gap between the holding blocks 38 may be present.

A further following third seat row may be displaced about a still further reduced distance $d_3$, for which two holding blocks 38 are utilized, which comprise a certain distance to each other. This distance limits the displacement distance $d_3$. The same applies for a still further following fourth seat row $d_4$, which in this example is the last seat row and comprises the lowest displacement distance $d_4$. This principle is applicable for all other groups of seat rows and may of course be enhanced or supplemented by seat covers.

Figure 4:
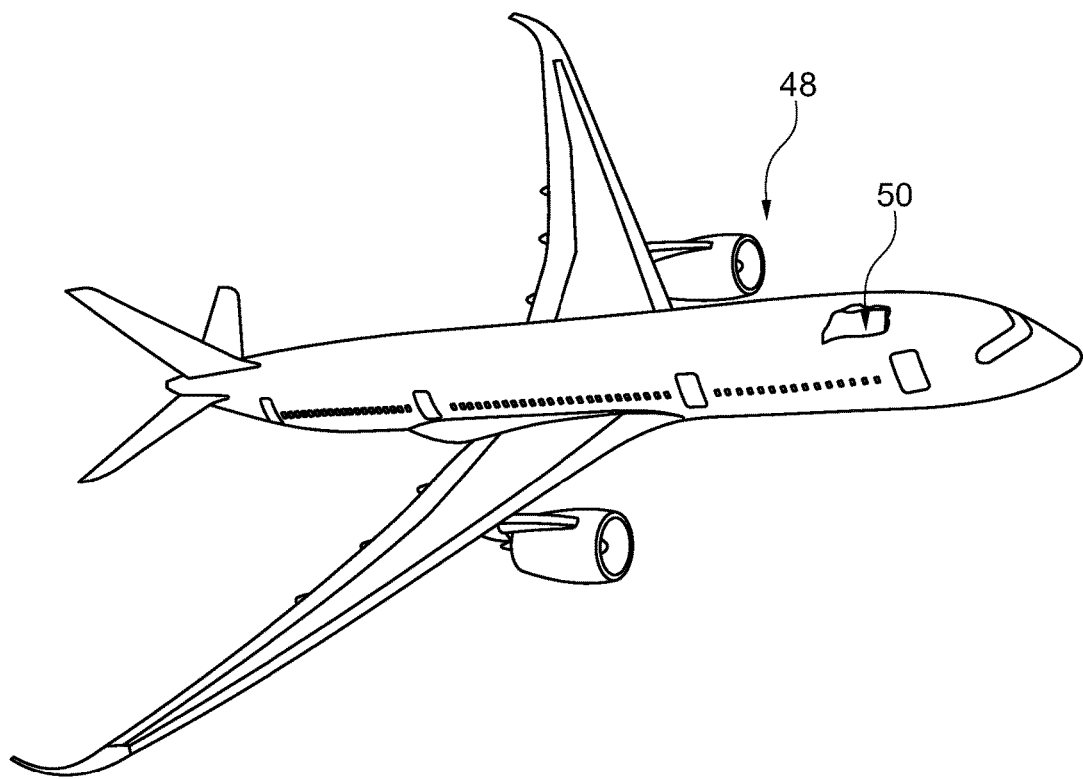
FIG. 4 shows an aircraft having a cabin therein, in which a rail system according to an embodiment of the invention is installed.

FIG. 4 finally shows an aircraft 48, which comprises a cabin 50 created therein, in which such a seat rail system 2 is integratable.

In addition, it should be pointed out that "comprising" does not exclude other elements or steps, and "a" or "an" does not exclude a plural number. Furthermore, it should be pointed out that characteristics or steps which have been described with reference to one of the above exemplary embodiments may also be used in combination with other characteristics or steps of other exemplary embodiments described above. Reference characters in the claims are not to be interpreted as limitations.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A seat rail system for a cabin of a vehicle, comprising:
   a seat rail having a top side having a plurality of raster openings and is couplable with a floor of the cabin;
   a plurality of holding devices positionable on the top side of the seat rail, each of which is selectively engageable with at least one first raster opening or at least one second raster opening for arresting the holding device and is configured for holding an object on the seat rail; and
   a plurality of marking devices couplable with the seat rail, and configured for optically or mechanically indicating approaching of a first position on the seat rail corresponding to the at least one first raster opening of a respective holding device and of a second position of the respective holding device corresponding to the at least one second raster opening, in relation to another object that is arrested on the seat rail, to prevent an arresting of the holding device on the seat rail on other positions,
   wherein at least one of the marking devices comprises a rail cover couplable with the top side of the seat rail, the rail cover having at least two overlapping sections that are movable relative to each other, and
   wherein at least one of the sections comprises a view opening facing away from the seat rail, which view opening is configured in a manner that exclusively in the first position and in the second position a respective position marking arranged between the at least one of the sections and the seat rail on a side of the rail cover that faces away from the seat rail is visible.

2. The seat rail system according to claim 1, wherein the first position and the second position of a holding device each corresponds to a first seat distance and a second seat distance of two seats or seat rows arranged on the seat rail.

3. The seat rail system according to claim 1, wherein one of the sections of the rail cover is connected to a first object and the other section is connected to a second object adjacent along the rail cover.

4. The seat rail system according to claim 1, wherein one of the plurality of marking devices comprises an insert, which is insertable into a raster opening of the seat rail.

5. The seat rail system according to claim 4,
wherein the insert comprises a cylindrical shape with an outer diameter, which is adapted to a diameter of a raster opening, and
wherein a length of the insert is dimensioned in a manner that the insert in the raster opening is flush with the top side of the seat rail.

6. The seat rail system according to claim 1,
further comprising at least one holding block engageable with at least one raster opening,
wherein the holding block is configured for providing a mechanical stop for a holding device fastened to the seat rail.

7. The seat rail system according to claim 1, wherein at least one holding block is provided for each object.

8. The seat rail according to claim 6,
wherein the object comprises a seat frame for receiving of seat surfaces, and
wherein for a group of objects a group of holding blocks is provided, wherein the group includes at least one holding block for each seat frame.

9. A seat arrangement for a passenger cabin of a vehicle, the seat arrangement comprising:
a seat rail system comprising:
a seat rail having a top side having a plurality of raster openings and is couplable with a floor of the cabin;
a plurality of holding devices positionable on the top side of the seat rail, each of which is selectively engageable with at least one first raster opening or at least one second raster opening for arresting the holding device and is configured for holding an object on the seat rail; and
a plurality of marking devices couplable with the seat rail, and configured for optically or mechanically indicating approaching of a first position on the seat rail corresponding to the at least one first raster opening of a respective holding device and of a second position of the respective holding device corresponding to the at least one second raster opening, in relation to another object that is arrested on the seat rail, to prevent an arresting of the holding device on the seat rail on other positions; and
at least one group of passenger seats or passenger seat rows, which are arranged adjacent to each other along a longitudinal direction of the seat rail,
wherein at least one of the marking devices comprises a rail cover couplable with the top side of the seat rail, which rail cover has at least two overlapping sections that are movable relative to each other, and
wherein at least one of the sections comprises a view opening facing away from the seat rail, which view opening is configured in a manner that exclusively in the first position and in the second position a respective position marking arranged between the at least one of the sections and the seat rail on a side of the rail cover that faces away from the seat rail is visible.

10. The seat arrangement according to claim 9, wherein the at least one group consists of twelve passenger seats or passenger seat rows at a maximum.

11. The seat arrangement according to claim 9, wherein each of the at least one group comprises a compactable object, which is selectively compactable for releasing installation space.

12. The seat arrangement according to claim 11, wherein the compactable object is a passenger seat or a passenger seat row having a seat component, which is foldable up.

13. The seat arrangement according to claim 9, wherein one of the sections of the rail cover is connected to a first object and the other section is connected to a second object adjacent along the rail cover.

14. The seat arrangement according to claim 9, wherein one of the plurality of marking devices comprises an insert, which is insertable into a raster opening of the seat rail.

15. The seat arrangement according to claim 14,
wherein the insert comprises a cylindrical shape with an outer diameter, which is adapted to a diameter of a raster opening, and
wherein a length of the insert is dimensioned in a manner that the insert in the raster opening is flush with the top side of the seat rail.

16. A vehicle having a passenger cabin and a seat arrangement arranged therein, the seat arrangement comprising:
a seat rail having a top side having a plurality of raster openings and is couplable with a floor of the cabin;
a plurality of holding devices positionable on the top side of the seat rail, each of which is selectively engageable with at least one first raster opening or at least one second raster opening for arresting the holding device and is configured for holding an object on the seat rail; and
a plurality of marking devices comprising one or more of a holding block and a rail cover, the plurality of marking devices couplable with the seat rail, and configured for optically or mechanically indicating approaching of a first position on the seat rail corresponding to the at least one first raster opening of a respective holding device and of a second position of the respective holding device corresponding to the at least one second raster opening, in relation to another object that is arrested on the seat rail, to prevent an arresting of the holding device on the seat rail on other positions.

17. The vehicle according to claim 16, wherein the vehicle is a commercial aircraft.

* * * * *